(12) United States Patent
Aynsley

(10) Patent No.: US 8,075,273 B2
(45) Date of Patent: Dec. 13, 2011

(54) FAN BLADE MODIFICATIONS

(75) Inventor: Richard Michael Aynsley, Doonan (AU)

(73) Assignee: Delta T Corporation, Lexington, KY (US)

( * ) Notice: Subject to any disclaimer, the term of this patent is extended or adjusted under 35 U.S.C. 154(b) by 120 days.

(21) Appl. No.: 12/649,833

(22) Filed: Dec. 30, 2009

(65) Prior Publication Data

US 2010/0104445 A1 Apr. 29, 2010

Related U.S. Application Data

(63) Continuation of application No. 11/777,344, filed on Jul. 13, 2007, now Pat. No. 7,654,798, which is a continuation of application No. 11/046,341, filed on Jan. 28, 2005, now Pat. No. 7,252,478.

(60) Provisional application No. 60/589,945, filed on Jul. 21, 2004.

(51) Int. Cl.
*B64C 11/18* (2006.01)

(52) U.S. Cl. ................ 416/191; 416/210 R; 416/210 A; 416/235; 416/237

(58) Field of Classification Search ................ 416/191, 416/210 R, 210 A, 204 R, 204 A, 235, 237
See application file for complete search history.

(56) References Cited

U.S. PATENT DOCUMENTS

| 1,041,913 | A | * | 10/1912 | Tyson |
|---|---|---|---|---|
| 2,014,032 | A | * | 9/1935 | Sharpe et al. |
| 3,524,712 | A | * | 8/1970 | Petrie et al. |
| 4,662,823 | A | * | 5/1987 | Cooke |
| 4,968,216 | A | * | 11/1990 | Anderson et al. |
| 5,152,606 | A | * | 10/1992 | Borraccia et al. ............ 416/207 |
| 5,226,783 | A | * | 7/1993 | Mita |
| 5,564,901 | A | * | 10/1996 | Moore |
| 5,725,355 | A | * | 3/1998 | Crall et al. |
| 5,823,480 | A | * | 10/1998 | La Roche |

(Continued)

FOREIGN PATENT DOCUMENTS

DE 3819145 * 12/1989

(Continued)

OTHER PUBLICATIONS 747-400, Screenshot from http://www.boeing.com/commercial/747family/pf/pf_exterior.html, printed on Aug. 11, 2008.

(Continued)

*Primary Examiner* — Igor Kershteyn
(74) *Attorney, Agent, or Firm* — Frost Brown Todd LLC

(57) ABSTRACT

A winglet is coupled with an end of a fan blade. The fan blade has an upper surface, a lower surface, a leading edge, and a trailing edge. The fan blade defines a chord and a maximum thickness. The winglet comprises a substantially vertical member that has a perimeter defined by a lower edge, an upper edge, and a rear edge, which meet at rounded corners. The rear edge of the vertical member has a length that is greater than the maximum thickness of the end of the fan blade. The vertical member has a length that is greater than the chord of the fan blade. The rear edge of the vertical member protrudes rearwardly relative to a vertical plane tangential to the trailing edge of the end of the fan blade. A mounting member may extend from the vertical member to couple the winglet with the fan blade.

20 Claims, 8 Drawing Sheets

U.S. PATENT DOCUMENTS

| | | | |
|---|---|---|---|
| 6,039,541 A * | 3/2000 | Parker et al. |
| 6,161,797 A * | 12/2000 | Kirk et al. |
| 6,244,821 B1 * | 6/2001 | Boyd et al. |
| 6,517,315 B2 * | 2/2003 | Belady |
| 6,565,320 B1 * | 5/2003 | Surls et al. |
| 6,719,533 B2 * | 4/2004 | Bird |
| 6,776,578 B2 * | 8/2004 | Belady |
| 6,884,034 B1 * | 4/2005 | Parker et al. |
| 6,939,108 B2 * | 9/2005 | Boyd |
| 7,252,478 B2 * | 8/2007 | Aynsley |
| 7,284,960 B2 * | 10/2007 | Aynsley |
| D587,799 S * | 3/2009 | Oleson |
| 2003/0095864 A1 * | 5/2003 | Ivanovic |
| 2008/0008596 A1 * | 1/2008 | Aynsley |
| 2008/0014090 A1 * | 1/2008 | Aynsley |
| 2008/0014092 A1 * | 1/2008 | Aynsley |
| 2008/0213097 A1 * | 9/2008 | Oleson |
| 2009/0072108 A1 * | 3/2009 | Oleson |
| 2009/0081045 A1 * | 3/2009 | Scherer et al. |
| 2009/0208333 A1 * | 8/2009 | Smith et al. |

FOREIGN PATENT DOCUMENTS

| | | | |
|---|---|---|---|
| EP | 1 619 391 | * | 1/2006 |
| GB | 100134 | * | 3/1917 |
| GB | 946 794 | | 1/1964 |
| GB | 2050530 | | 1/1981 |
| GB | 2 198 190 | * | 6/1988 |
| WO | WO 2006/022812 | | 3/2006 |

OTHER PUBLICATIONS

Author Unknown; A Fan for All Seasons; Dec. 1999; Bell & Howell Information and Learning, American Society of Mechanical Engineers; Mechanical Engineering vol. 121, No. 12 pp. 58-60.

Author Unknown; Airfoil Design: HVLS, dated Dec. 9, 2002.

Author Unknown; Dairy Notes; May 1999; University of California Cooperative Extension.

Author Unknown; Technical Guide: Commercial Industrial & Special Application Ceiling Fans; publisher and date unknown.

Boeing 747-400 Twin-Aisle Jet Airliner, USA Screenshot from http://www.aerospacetechnology.com/projects/747/7473.html, printed on Aug. 11, 2008.

EPO Search Report, dated Jul. 1, 2008, for EP 05 250 653.2, pp. 1-6.

EPO Search Report, dated Jul. 1, 2008, for EP 05 250 654.0, pp. 1-6.

EPO Search Report, dated Aug. 21, 2006 for EP 05250653.2.

EPO Search Report, dated Aug. 22, 2006 for EP 05250654.0.

Fairbank et al.; A Large Paddle Fan for Livestock Cooling; Jun. 1989; Canadian Society of Agricultural Engineering.

General Exterior Arrangement 737, Screenshot from http://www.boeing.com/commercial/737family/pf/pf_exterior.html, printed on Aug. 11, 2008.

Image: Winglet and nav light arp.jpg, Screenshot from http://en.wikipedia.org/wiki/Image:Winglet_and_nav_light_arp.jpg, printed Aug. 11, 2008.

International Search Report, completion dated Jun. 24, 2008 for Application No. PCT/US2008/055266.

International Search Report, dated Aug. 19, 2005 for PCT Application No. PCT/US05/02703.

Jain et al.; Experimental Investigation of the Flow Field of a Ceiling Fan; Jul. 2004; ASME Heat Transfer/Fluids Engineering Summer Conference; Paper No. HT-FED-2004-56226.

KC-135A in flight—closeup of winglet with attached tufts, Screenshot from http://www.dfrc.nasa.gov/gallery/Photo/KC-135/Small/EC79-11481.jpg, printed on Aug. 11, 2008.

KC-135A in flight-winglet study, EC79-11314, Screensho from http://www.dfrc.nasa.gov/gallery/Photo/KC-135/Small/EC79-11314.jpg, printed on Aug. 11, 2008.

KC-135A in flight-winglet study, EC79-11484, Screenshot from http://dfrc.nasa.gov/gallery/Photo/KC-135/Small/EC79-11484.jpg, printed Aug. 11, 2008.

Montoya, L.C., KC-135 Winglet Flight Results, NASA Dryden Flight Research Center, pp. 145-156.

NASA Dryden Technology Facts—Winglets, Screenshot from http://www.nasa.gov/centers/dryden/about/Organizations/Technology/Facts/TF-2004-15-D, printed on Aug. 11, 2008.

Office Action dated Jan. 23, 2007 for U.S. Appl. No. 11/046,341, filed Jan. 28, 2005.

Office Action dated Jan. 25, 2007 for U.S. Appl. No. 11/046,593, filed Jan. 28, 2005.

Office Action dated May 14, 2007 for U.S. Appl. No. 11/046,593, filed Jan. 28, 2005.

Screenshots from oea.larc.nasa.gov, relating to winglets, printed May 2004.

Screenshots from Penn State Engineering website, relating to winglets, printed May 2004.

Screenshots from www.b737.org.uk, relating to winglets, printed May 2004.

Winglet Detail, Screenshot from http://upload.wikimedia.org/wikipedia/commons/5/53/Wingletdetail.jpg, printed on Aug. 11, 2008.

Wingtip Device, screenshot from http://en.wikipedia.org/wiki/Wingtip_device, printed Aug. 11, 2008.

Written Opinion dated Jan. 7, 2008 for Application No. PCT/US2008/055266.

Written Opinion, dated Aug. 19, 2005 for PCT Application No. PCT/US05/02703.

* cited by examiner

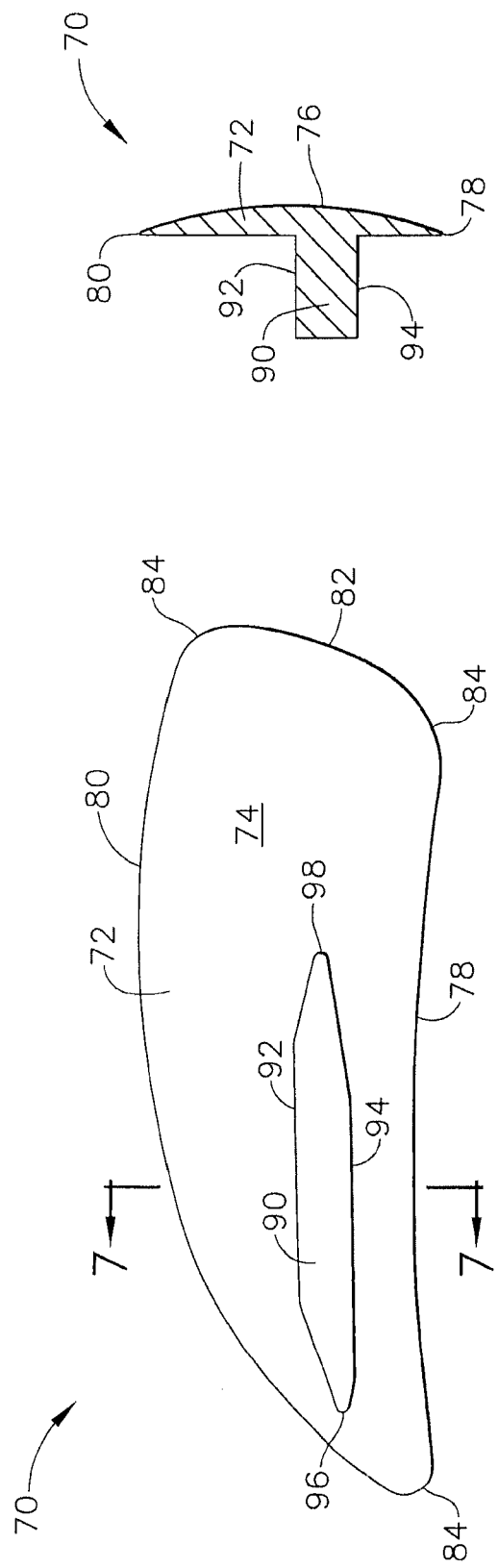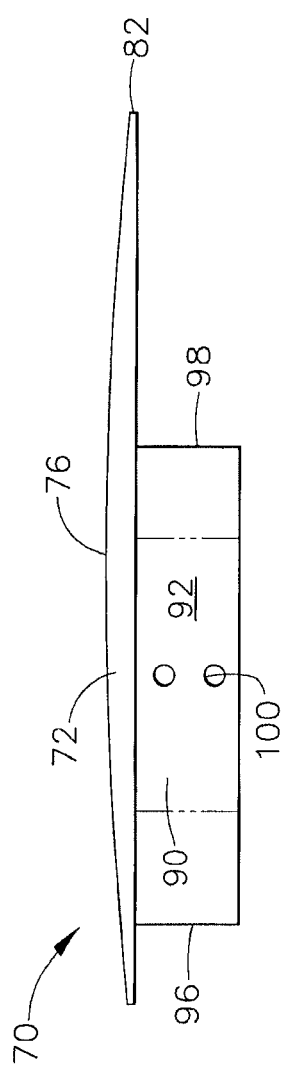
FIG. 7
FIG. 6
FIG. 8

FAN BLADE MODIFICATIONS

PRIORITY

This application is a continuation of U.S. patent application Ser. No. 11/777,344, entitled "Fan Blade Modifications," filed Jul. 13, 2007, which is incorporated by reference herein, which is a continuation of U.S. patent application Ser. No. 11/046,341, entitled "Fan Blade Modifications," filed Jan. 28, 2005, which is incorporated by reference herein, and which claims priority from the disclosure of U.S. Provisional Patent Application Ser. No. 60/589,945, entitled "Fan Blades and Modifications," filed Jul. 21, 2004, which is incorporated by reference herein.

BACKGROUND OF THE INVENTION

The present invention relates generally to fan blades and fan blade modifications, and is particularly directed to an airfoil suitable for use with a fan blade and a winglet suitable for use with a fan blade.

People who work in large structures such as warehouses and manufacturing plants may be exposed to working conditions that range from being uncomfortable to hazardous. The same may also apply in agricultural settings, such as in a structure that is full of livestock. On a hot day, the inside air temperature may reach a point where a person or other animal is unable to maintain a healthy or otherwise desirable body temperature. In areas where temperatures are uncomfortably or unsafely high, it may be desirable to have a device operable to create or enhance airflow within the area. Such airflow may, in part, facilitate a reduction in temperature in the area.

Moreover, some activities that occur in these environments, such as welding or operating internal combustion engines, may create airborne contaminants that can be deleterious to those exposed. The effects of airborne contaminants may be magnified if the air flow in the area is less than ideal. In these and similar situations, it may be desirable to have a device operable to create or enhance airflow within the area. Such airflow may, in part, facilitate the reduction of deleterious effects of contaminants, such as through dilution and/or removal of contaminants.

In certain structures and environments, a problem may arise with heat gathering and remaining near the ceiling of the structure. This may be of concern where the area near the floor of the structure is relatively cooler. Those of ordinary skill in the art will immediately recognize disadvantages that may arise from having this or other imbalanced air/temperature distribution. In these and similar situations, it may be desirable to have a device operable to create or enhance airflow within the area. Such airflow may, in part, facilitate de-stratification and the inducement of a more ideal air/temperature distribution.

It may also be desirable to have a fan capable of reducing energy consumption. Such a reduction of energy consumption may be effected by having a fan that runs efficiently (e.g., less power is required to drive the fan as compared to other fans). A reduction of energy consumption may also be effected by having a fan that improves air distribution, thereby reducing heating or cooling costs associated with other devices.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings:

FIG. 6 is side view of an exemplary winglet fan blade modification

FIG. 7 is a cross-sectional view of the winglet of FIG. 6.

FIG. 8 is a top view of the winglet of FIG. 6.

Reference will now be made in detail to the present preferred embodiment of the invention, an example of which is illustrated in the accompanying drawings.

DETAILED DESCRIPTION OF AN EMBODIMENT OF THE INVENTION

Figure 1:
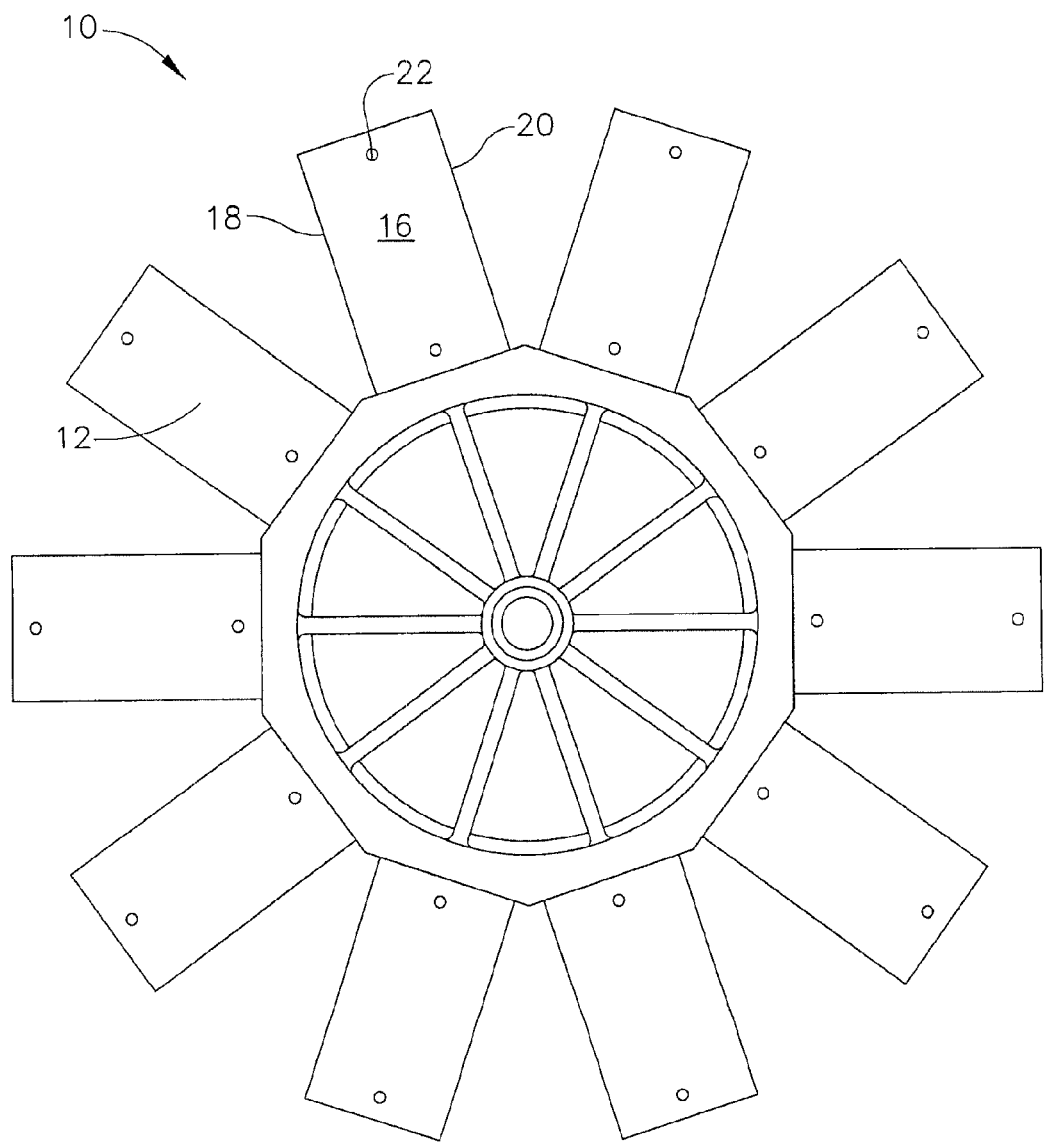
FIG. 1 is a plan view of a hub for mounting fan blades.

Referring now to the drawings in detail, wherein like numerals indicate the same elements throughout the views, FIG. 1 shows exemplary fan hub (10), which may be used to provide a fan having fan blades (30 or 50). In the present example, fan hub (10) includes a plurality of hub mounting members (12) to which fan blades (30 or 50) may be mounted. In one embodiment, fan hub (10) is coupled to a driving mechanism for rotating fan hub (10) at selectable or predetermined speeds. A suitable hub assembly may thus comprise hub (10) and a driving mechanism coupled to hub (10). Of course, a hub assembly may include a variety of other elements, including a different hub, and fan hub (10) may be driven by any suitable means. In addition, fan hub (10) may have any suitable number of hub mounting members (12).

Figure 2:
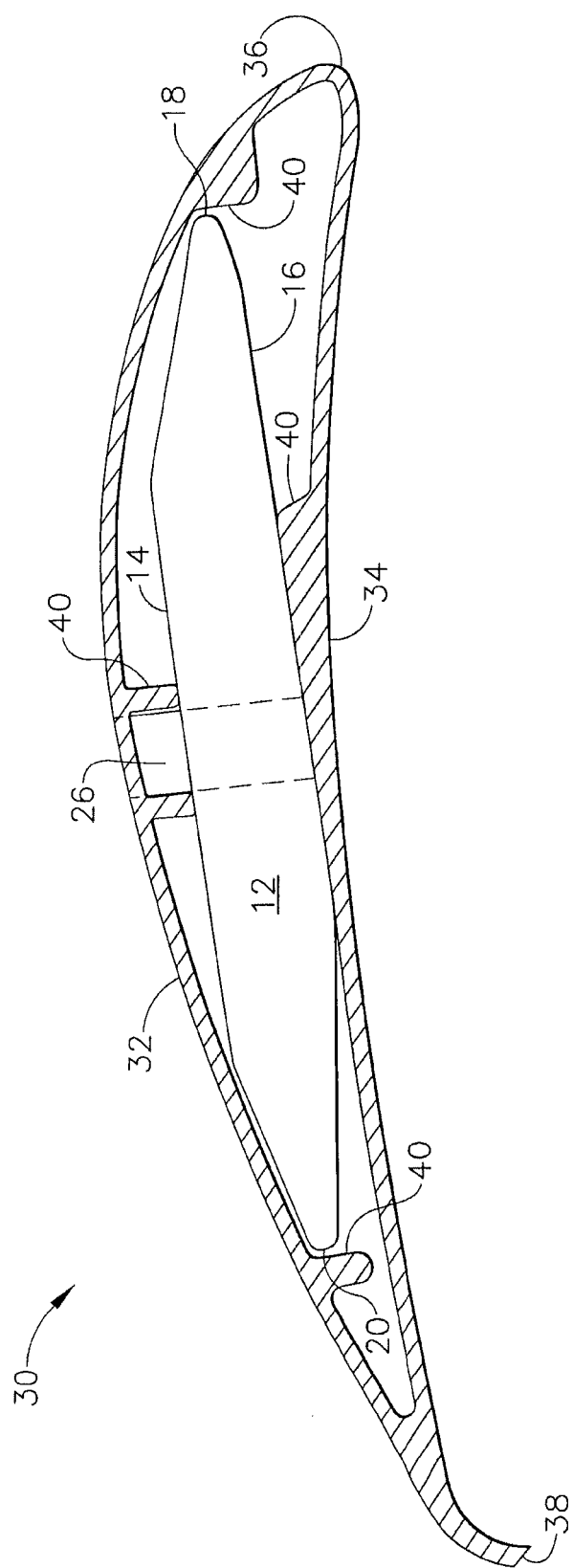
FIG. 2 is a cross-sectional view of an exemplary fan blade airfoil.
Figure 3:
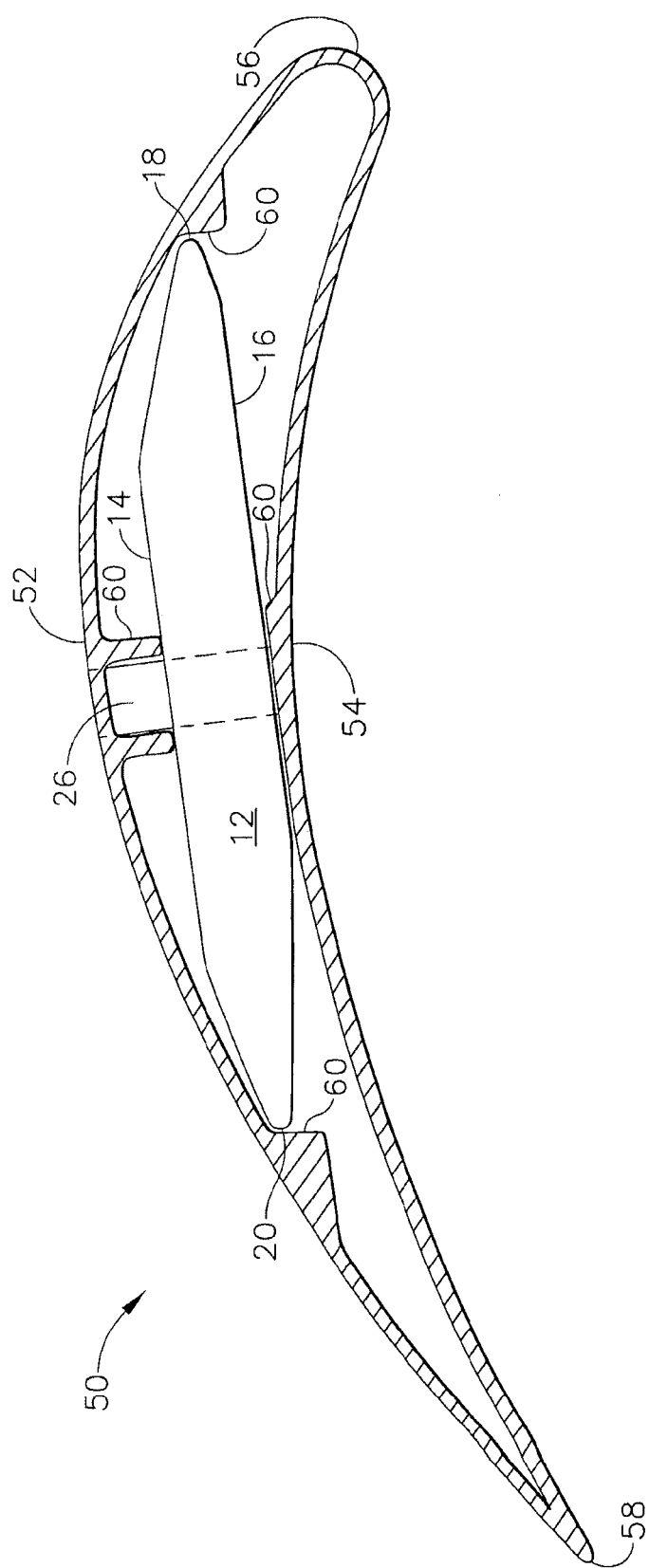
FIG. 3 is a cross-sectional view of an alternative exemplary fan blade airfoil

As shown in FIGS. 1 through 3, each hub mounting member (12) has top surface (14) and bottom surface (16), which terminate into leading edge (18) and trailing edge (20). In addition, each hub mounting member (12) includes opening (22) formed through top surface (14) and going through bottom surface (16). In the present example, opening (22) is sized to receive fastener (26). Each hub mounting member (12) is configured to receive fan blade (30 or 50). Those of ordinary skill in the art will appreciate that hub mounting members (12) may be provided in a variety of alternative configurations.

In one embodiment, fan blades (30 or 50) are mounted to the hub assembly disclosed in U.S. Pat. No. 6,244,821. Of course, fan blades (30 or 50) may be mounted to any other hub and/or hub assembly. A suitable hub assembly may be operable to rotate hub (10) at any suitable angular speed. By way of example only, such angular speed may be anywhere in the range of approximately 7 and 108 revolutions per minute.

FIG. 2 shows a cross section of exemplary fan blade (30) having curled trailing edge (38), mounted to hub (10). The cross section is taken along a transverse plane located at the center of fan blade (30), looking toward hub (10). Fan blade (30) has top surface (32) and bottom surface (34), each of which terminate into leading edge (36) and trailing edge (38). As shown, trailing edge (38) has a slope of approximately 45° relative to portion of top surface (32) that is proximate to trailing edge (38) and portion of bottom surface (34) that is proximate to trailing edge (38). Of course, trailing edge (38) may have any other suitable slope, such as 0° by way of example only, to the extent that it comprises a single, flat surface. Other suitable trailing edge (38) configurations will be apparent to those of ordinary skill in the art.

In the present example, fan blade (30) is substantially hollow. A plurality of ribs or bosses (40) are located inside fan blade (30). As shown, when hub mounting member (12) is inserted into fan blade (30), ribs or bosses (40) are positioned such that they contact top surface (14), bottom surface (16), leading edge (18), and trailing edge (20) of hub mounting member (12). Bosses (40) thus provide a snug fit between fan blade (30) and hub mounting member (12). Alternative configurations for fan blade (30), including but not limited to those affecting the relationship between fan blade (30) and hub mounting member (12), will be apparent to those of ordinary skill in the art.

As used herein, terms such as "chord," "chord length," "maximum thickness," "maximum camber," "angle of attack," and the like, shall be ascribed the same meaning ascribed to those terms as used in the art of airplane wing or other airfoil design. In one embodiment, fan blade (30) has a chord length of approximately 6.44 inches. Fan blade (30) has a maximum thickness of approximately 16.2% of the chord; and a maximum camber of approximately 12.7% of the chord. The radius of leading edge (36) is approximately 3.9% of the chord. The radius of trailing edge (38) quadrant of bottom surface (34) is approximately 6.8% the chord. In an alternate embodiment, fan blade (30) has a chord of approximately 7 inches. In another embodiment, fan blade (30) has a chord of approximately 6.6875 inches. Of course, any other suitable dimensions and/or proportions may be used.

By way of example only, fan blade (30) may display lift to drag ratios ranging from approximately 39.8, under conditions where the Reynolds Number is approximately 120,000, to approximately 93.3, where the Reynolds Number is approximately 250,000. Of course, other lift to drag ratios may be obtained with fan blade (30).

In one embodiment, fan blade (30) displays drag coefficients ranging from approximately 0.027, under conditions where the Reynolds Number is approximately 75,000, to approximately 0.127, where the Reynolds Number is approximately 112,500. Of course, other drag coefficients may be obtained with fan blade (30).

In one example, under conditions where the Reynolds Number is approximately 200,000, fan blade (30) moves air such that there is a velocity ratio of approximately 1.6 at bottom surface (34) at trailing edge (38) of fan blade (30). Other velocity ratios may be obtained with fan blade (30).

In one embodiment, fan blade (30) provides non-stall aerodynamics for angles of attack between approximately −1° to 7°, under conditions where the Reynolds Number is approximately 112,000; and angles of attack between approximately −2° to 10°, where the Reynolds number is approximately 250,000. Of course, these values are merely exemplary.

FIG. 3 shows a cross section of another exemplary fan blade (50) having generally elliptical top surface (52) and bottom surface (54), each of which terminate in leading edge (56) and trailing edge (58), mounted to hub (10). The cross section is taken along a transverse plane located at the center of fan blade (50), looking toward hub (10). In the present example, fan blade (50) is hollow. A plurality of bosses (60) are located inside fan blade (50). As shown, when hub mounting member (12) is inserted into fan blade (50), bosses (60) are positioned such that they contact top surface (14), bottom surface (16), leading edge (18), and trailing edge (20) of hub mounting member (12). Bosses (60) thus provide a snug fit between fan blade (50) and hub mounting member (12). Alternative configurations for fan blade (50), including but not limited to those affecting the relationship between fan blade (50) and hub mounting member (12), will be apparent to those of ordinary skill in the art.

As shown, fan blade (50) has a lower radius of curvature toward its leading edge (56), as compared to a higher radius of curvature toward its trailing edge (58). The curvatures of fan blade (50) may be obtained, at least in part, through the generation of two ellipses using the following formulae. Those of ordinary skill in the art will appreciate that a first ellipse, with its origin at the intersection of Cartesian x and y axes, may be generated by these equations:

$$x = a(\mathrm{COS}(t)) \quad [1], \text{and}$$

$$y = b(\mathrm{SIN}(t)) \quad [2],$$

where
a = length of primary radius,
b = length of secondary radius, and
t = angle of rotation of a radius about the origin (e.g., in radians).

Accordingly, a first ellipse may be generated using the foregoing equations. Similarly, a set of coordinates for the first ellipse may be obtained using equations [1] and [2]. Exemplary first ellipse (200) is illustrated in the graph depicted in FIG. 4, where a=3 and b=2.

Coordinates for a second ellipse may be obtained using these equations:

$$x_2 = x(\mathrm{COS}(\theta)) - y(\mathrm{SIN}(\theta)) \quad [3], \text{and}$$

$$y_2 = y(\mathrm{COS}(\theta)) - x(\mathrm{SIN}(\theta)) \quad [4],$$

where
$x_2$ = the second "x" coordinate after a counterclockwise rotation of the first ellipse through θ radians about the origin, and
$y_2$ = the second "y" coordinate after a counterclockwise rotation of the first ellipse through θ radians about the origin.

Figure 4:
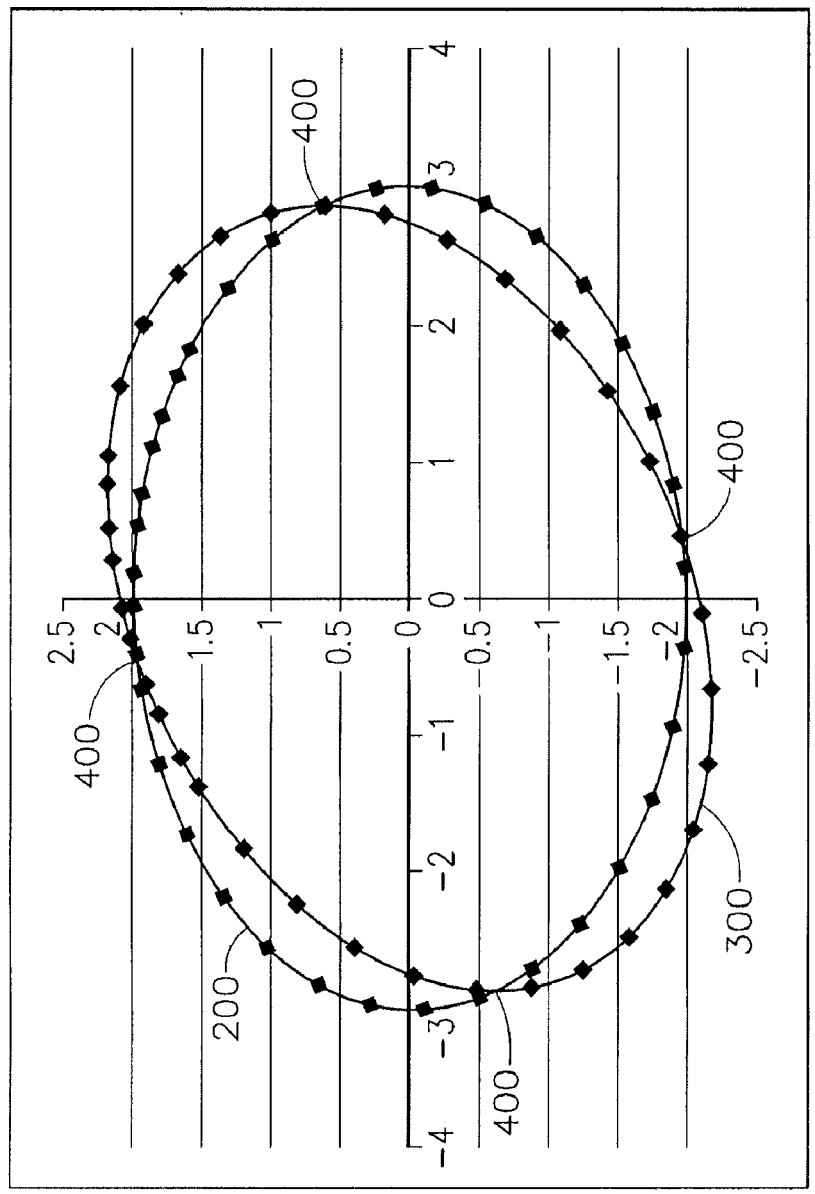
FIG. 4 depicts a graph showing two ellipses.

Thus, the dimensions of the second ellipse are dependent on the dimensions of the first ellipse. Exemplary second ellipse (300) is illustrated in the graph depicted in FIG. 4, where θ=0.525 radians. It will be appreciated that, where a first and second ellipse are plotted in accordance with equations [1] through [4], the two ellipses may intersect at four points ("ellipse intersections"). FIG. 4 shows four ellipse intersections (400) between first ellipse (200) and second ellipse (300).

Figure 5:
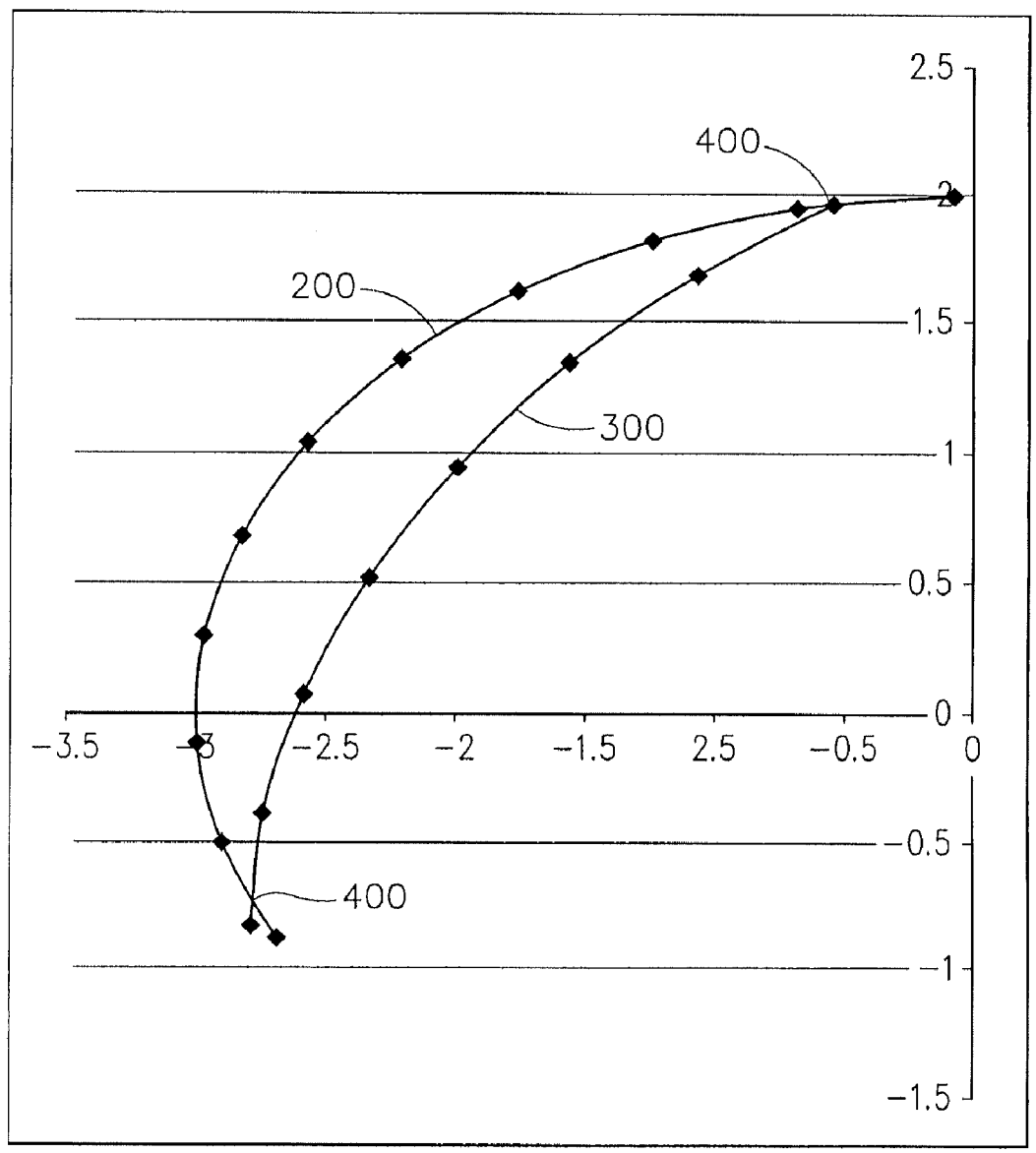
FIG. 5 depicts a portion of the graph of FIG. 4.

The curvature of top surface (52) and bottom surface (54) may be based, at least in part, on the curvature of the first and second ellipses between two consecutive ellipse intersections. An example of such a segment of first ellipse (200) and second ellipse (300) is shown in FIG. 5, which depicts the portion of ellipses (200 and 300) between consecutive ellipse intersections (400). Accordingly, equations [1] through [4] may be used to generate surface coordinates for at least a portion of top surface (52) and bottom surface (54) of fan blade (50).

It will be appreciated that the chord length-to-thickness ratio of fan blade (50) may vary with the amount of rotation, θ, relative the two ellipses.

Of course, portions of fan blade (50) may deviate from the curvature of the first and second ellipses. By way of example only, and as shown in FIG. 3, leading edge (56) may be modified to have a generally circular curvature. Other deviations will be apparent to those of ordinary skill in the art.

In one embodiment, fan blade (50) is created using equations [1] through [4] with a=3 units, b=2 units, and θ=0.525 radians. In this embodiment, fan blade (50) is fit with circular leading edge (56) having a diameter of 3.5% of chord length. This leading (56) edge curvature is fit tangentially to that of top surface (52) and bottom surface (54). Such a fit may be envisioned by comparing FIGS. 3 and 5. Of course, other dimensions may be used.

In one embodiment, fan blade (50) has a chord length of approximately 7.67 inches. In another embodiment, fan blade has a chord length of approximately 7.687 inches. Of course, fan blade (50) may have any other suitable chord length.

In the present example, the radius of leading edge (56) is approximately 3.5% of the chord. The maximum thickness of fan blade (50) is approximately 14.2% of the chord. The maximum camber of fan blade (50) is approximately 15.6% of the chord. Of course, any other suitable dimensions and/or proportions may be used.

In one example, a fan having a 24-foot diameter and comprising ten fan blades (50) mounted at an angle of attack of 10° produces a thrust force of approximately 5.2 lb. when rotating at approximately 7 revolutions per minute (rpm), displacing approximately 87,302 cubic feet per minute (cfm). When rotating at approximately 14 rpm, the fan produces a thrust force of approximately 10.52 lb., displacing approximately 124,174 cfm. When rotating at approximately 42 rpm, the fan produces a thrust force of approximately 71.01 lb., displacing approximately 322,613 cfm. Other thrust forces and/or displacement volumes may be obtained with a fan having fan blades (50).

By way of example only, fan blade (50) having an angle of attack of approximately 10° may display lift to drag ratios ranging from approximately 39, under conditions where the Reynolds Number is approximately 120,000, to approximately 60, where the Reynolds Number is approximately 250,000. Other lift to drag ratios may be obtained with fan blade (50).

In one embodiment, fan blade (50) provides non-stall aerodynamics for angles of attack between approximately 1° to 11°, under conditions where the Reynolds Number is approximately 112,000; for angles of attack between approximately 0° and 13°, where the Reynolds number is approximately 200,000; and for angles of attack between approximately 1° to 13°, where the Reynolds number is approximately 250,000. Of course, these values are merely exemplary.

In one example, a fan having a 14-foot diameter and comprising ten fan blades (50) is rotated at approximately 25 rpm. The fan runs at approximately 54 watts, with a torque of approximately 78.80 inch-pounds (in.lbs.) and a flow rate of approximately 34,169 cfm. The fan thus has an efficiency of approximately 632.76 cfm/Watt.

In another example, a fan having a 14-foot diameter and comprising ten fan blades (50) is rotated at approximately 37.5 rpm. The fan runs at approximately 82 watts, with a torque of approximately 187.53 inch-pounds (in.lbs.) and a flow rate of approximately 62,421 cfm. The fan thus has an efficiency of approximately 761.23 cfm/Watt.

In yet another example, a fan having a 14-foot diameter and comprising ten fan blades (50) is rotated at approximately 50 rpm. The fan runs at approximately 263 watts, with a torque of approximately 376.59 inch-pounds (in.lbs.) and a flow rate of approximately 96,816 cfm. The fan thus has an efficiency of approximately 368.12 cfm/Watt.

The following may be applied to any fan blade, including by way of example only, fan blade (30) or fan blade (50):

In one embodiment, each fan blade (30 or 50) comprises a homogenous continuum of material. By way of example only, fan blades (30 and 50) may be constructed of extruded aluminum. However, it will be appreciated that fan blades (30 and/or 50) may be constructed of any other suitable material or materials, including but not limited to any metal and/or plastic. In addition, it will be appreciated that fan blades (30 and/or 50) may be made by any suitable method of manufacture, including but not limited to stamping, bending, welding, and/or molding. Other suitable materials and methods of manufacture will be apparent to those of ordinary skill in the art.

When fan blade (30 or 50) is mounted to hub (10), hub mounting members (12) may extend into fan blade (30 or 50) approximately 6 inches, by way of example only. Alternatively, hub mounting members (12) may extend into fan blade (30 or 50) to any suitable length. It will also be appreciated that hub (10) may have mounting members (12) that fit on the outside of fan blades (30 or 50), rather than inside. Alternatively, mounting members (12) may fit both partially inside and partially outside fan blades (30 or 50).

Fan blade (30 or 50) may also include one or more openings configured to align with openings (22) in hub mounting member (12). In this embodiment, when openings in fan blade (30 or 50) are aligned with openings (22) in hub mounting member (12), fastener (26) may be inserted through the openings to secure fan blade (30 or 50) to hub mounting member (12). In one embodiment, fastener (26) is a bolt. Other suitable alternatives for fastener(s) (26) will be apparent to those of ordinary skill in the art, including but not limited to adhesives. Accordingly, it will be understood that openings (22) are optional.

Fan blade (30 or 50) may be approximately 4, 5, 6, 7, 8, 9, 10, 11, 12, 13, or 14 feet long. Alternatively, fan blade (30 or 50) may be of any other suitable length. In one embodiment, fan blade (30 or 50) and hub (10) are sized such that a fan comprising fan blades (30 or 50) and hub (10) has a diameter of approximately 24 feet. In another embodiment, fan blade (30 or 50) and hub (10) are sized such that a fan comprising fan blades (30 or 50) and hub (10) has a diameter of approximately 14 feet. Other suitable dimensions will be apparent to those of ordinary skill in the art.

It will be appreciated that all cross sections along the length of fan blade (30 or 50) need not be identical. In other words, the configuration of fan blade (30 or 50) need not be uniform along the entire length of fan blade (30 or 50). By way of example only, a portion of the "hub mounting end" of fan blade (30 or 50) (i.e. the end of fan blade (30 or 50) that will be mounted to hub (10)) may be removed. In one example, an oblique cut is made to leading edge (56) of fan blade (50) to accommodate another blade (50) on hub (10).

Alternatively, fan blade (30 or 50) may be formed or constructed such that a portion of the hub mounting end or another portion is omitted, relieved, or otherwise "missing." It will be appreciated that the absence of such a portion (regardless of whether it was removed or never there to begin with) may alleviate problems associated with blades (30 or 50) interfering with each other at hub (10). Such interference may be caused by a variety of factors, including but not limited to chord length of fan blades (30 or 50). Of course, factors other than interference may influence the removal or other absence of a portion of fan blade (30 or 50). The absent portion may comprise a portion of leading edge (36 or 56), a portion of trailing edge (38 or 58), or both.

Alternatively, to address fan blade (30 or 50) interference at hub (10), the diameter of hub may be increased (e.g., such as without increasing the number of hub mounting members (12)). Alternatively, the chord of fan blades (30 or 50) may be reduced. Still other alternatives and variations of hub (10) and/or fan blades (30 or 50) will be apparent to those of ordinary skill in the art.

Those of ordinary skill in the art will appreciate that fan blade (30 or 50) may have a zero or non-zero angle of attack. By way of example only, when mounted to hub mounting member (12), fan blade (30 or 50) may have an angle of attack in the range of approximately −1° to 7°, inclusive; between −2° and 10°, inclusive; or approximately 7°, 8°, 10°, or 13° by way of example only. Of course, fan blade (30 or 50) may have any other suitable angle of attack. Fan blade (30 or 50) may be substantially straight along its length, and the angle of attack may be provided by having hub mounting member (12) with the desired angle of attack.

Alternatively, the angle of attack of hub mounting member (12) may be zero, and an angle of attack for fan blade (30 or 50) may be provided by a twist in fan blade (30 or 50). In other words, fan blade (30 or 50) may be substantially straight along the length to which hub mounting member (12) extends in fan blade (30 or 50), and a twist may be provided to provide an angle of attack for the remaining portion of fan blade (30 or 50). Such a twist may occur over any suitable length of fan blade (30 or 50) (e.g. the entire remainder of fan blade (30 or 50) length has a twist; or the twist is brief, such that nearly all of the remainder of fan blade (30 or 50) is substantially straight; etc.). Still other suitable configurations and methods for providing an angle of attack for all or part of fan blade (30) will be apparent to those of ordinary skill in the art. In addition, it will be appreciated that all or any portion of fan blade (30 or 50) may have one or more twists for any purpose.

Those of ordinary skill in the art will appreciate that a fan blade (e.g., 30 or 50) may be modified in a number of ways. Such modifications may alter the characteristics of fan performance. As illustrated in exemplary form in FIGS. 6 through 10, one such modification may include winglet (70). While winglets (70) will be discussed in the context of fan blades (30 and 50), it will be appreciated that winglets (70) may be used with any other suitable fan blades.

Winglet (70) of the present example includes vertical member (72). Vertical member (72) comprises flat inner surface (74) and rounded outer surface (76). Other suitable configurations for inner surface (74) and outer surface (76) will be apparent to those of ordinary skill in the art. In the present example, the perimeter of vertical member (72) is defined by lower edge (78), upper edge (80), and rear edge (82). Each edge (78, 80, and 82) meets generally at respective corner (84). Thus, in the present example, vertical member (72) has three corners (84). As shown, each corner (84) is rounded. Accordingly, the term "corner," as that term is used herein, shall not be read to require a sharp angle. In other words, a corner need not be limited to a point or region at which a pair of straight lines meet or intersect. While in the present example vertical member (72) is described as having three corners, it will be appreciated that vertical member (72) may have any suitable number of corners (84).

Other variations of vertical member (72) will be apparent to those of ordinary skill in the art.

Winglet (70) of the present example further includes winglet mounting member (90), which extends substantially perpendicularly from inner surface (74) of vertical member (72). As shown, winglet mounting member (90) is configured similar to hub mounting member (12). Winglet mounting member (90) has top surface (92) and bottom surface (94), which each terminate into leading edge (96) and trailing edge (98). In addition, each winglet mounting member (92) includes openings (100) formed through top surface (92) and bottom surface (94). In the present example, each opening (100) is sized to receive fastener (26). Winglet mounting member (90) is configured to be inserted into an end of fan blade (30 or 50). Those of ordinary skill in the art will appreciate that winglet mounting members (90) may be provided in a variety of alternative configurations.

Figure 9:
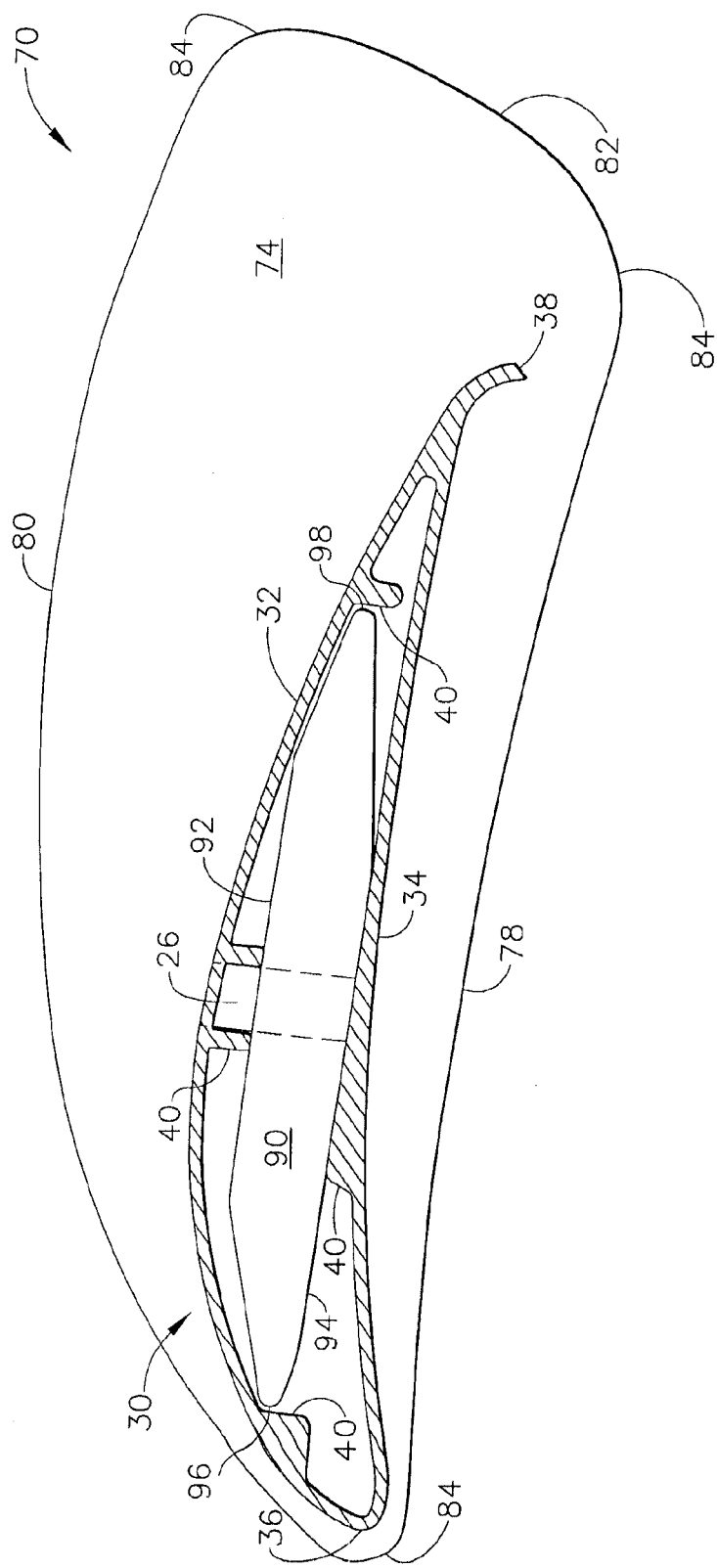
FIG. 9 is an end view of the fan blade of FIG. 2 modified with the winglet of FIG. 6.
Figure 10:
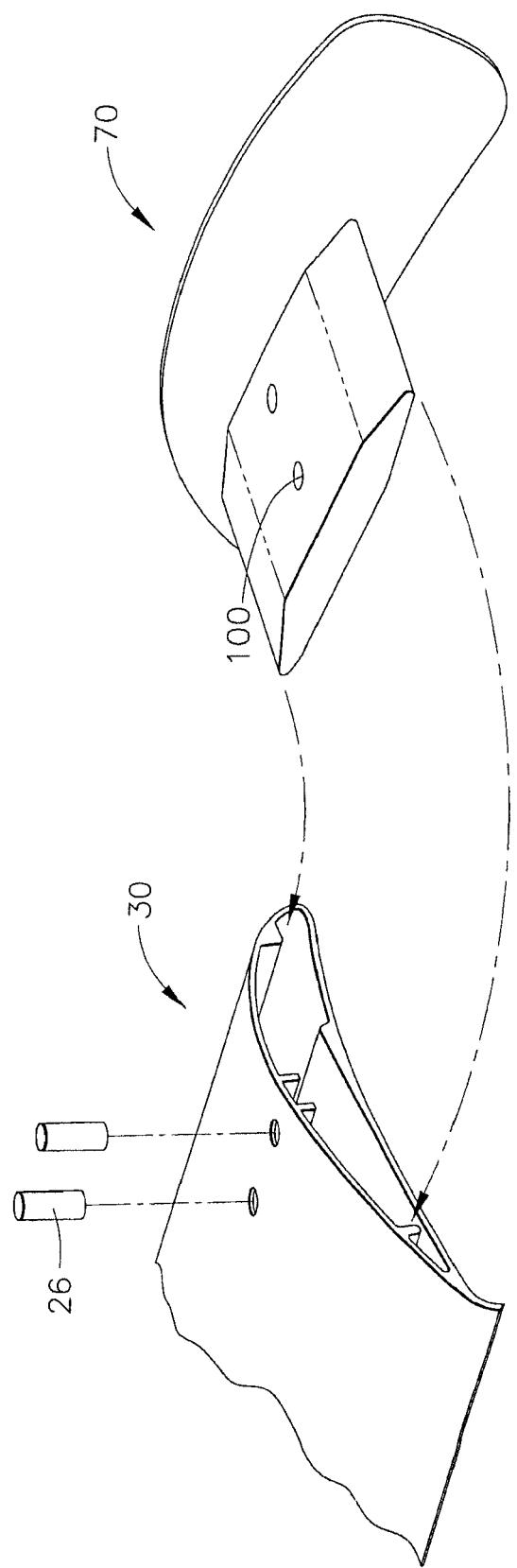
FIG. 10 is an exploded perspective view of the winglet-blade assembly of FIG. 9.

FIG. 9 shows a cross section of fan blade (30) with winglet (70) mounted thereto. The cross section is taken along a transverse plane located at the center of fan blade (30), looking toward winglet (70) (i.e. away from hub (10)). In the present example, and as shown in FIGS. 9 and 10, winglet mounting member (90) is configured to fit in the end of fan blade (30 or 50). Like hub mounting member (12), winglet mounting member (90) fits snugly against bosses (40 or 60) in fan blade (30 or 50). In the present example, upper edge (80) of winglet (70) extends above top surface (32 or 52) of fan blade (30 or 50), in addition to extending beyond leading edge (36 or 56). Similarly, lower edge (78) of winglet (70) extends below bottom surface (34 or 54) of fan blade (30 or 50). Rear edge (82) of winglet (70) extends beyond trailing edge (38 or 58) of fan blade (30 or 50). Of course, winglets (70) and fan blades (30 or 50) may have any other relative sizing and/or configuration.

Fan blade (30 or 50) may have one or more openings, formed near the tip of fan blade (30 or 50) through top surface (32 or 52) and/or bottom surface (34 or 54), which is/are positioned to align with opening(s) (100) in winglet mounting member (90) when winglet mounting member (90) is inserted into fan blade (30 or 50), and which is/are sized to receive fastener (26). Winglets (70) may thus be secured to fan blades (30 or 50) with one or more fasteners (26). In one embodiment, fastener (26) is a bolt. In another embodiment, fastener (26) comprises a complimentary pair of thin head interlocking binding screws, such as screw posts occasionally used to bind a large volume of papers together (e.g., "male" screw with threaded outer surface configured to mate with "female" screw having threaded inner surface). However, any other suitable fastener(s) may be used, including but not limited to adhesives. Accordingly, it will be appreciated that openings (100) are optional.

It will also be appreciated that winglet mounting member (90) need not be inserted into an end of fan blade (30 or 50). In other words, and similar to hub mounting members (12), winglet mounting member (90) may be made to fit on the outside of fan blades (30 or 50), rather than inside. Alternatively, winglet mounting members (90) may fit both partially inside and partially outside fan blades (30 or 50). Still other configurations will be apparent to those of ordinary skill in the art.

In an alternate embodiment, winglet (70) lacks mounting member (90), and instead has a recess formed in inner surface (74) of vertical member (72). In this embodiment, the tip of fan blade (30 or 50) is inserted into winglet (70) for attachment of winglet (70) to fan blade (30 or 50). In yet another embodiment, fan blade (30 or 50) is integrally formed with winglet (70). Accordingly, those of ordinary skill in the art will appreciate that there exists a variety of configurations for providing fan blade (30 or 50) with winglet (70).

While vertical member (72) is shown as being substantially perpendicular to mounting member (90), it will be appreciated that these two members may be at any suitable angle relative to each other. Thus, and by way of example only, vertical member (72) may tilt inward or outward when winglet (70) is attached to fan blade (30 or 50). Alternatively, vertical member (72) may comprise more than one angle. In other words, vertical member (72) may be configured such that the top portion of vertical member and the bottom portion of vertical member each tilt inward when winglet is attached to fan blade (30 or 50). Other variations of winglet (70), including but not limited to angular variations, will be apparent to those of ordinary skill in the art.

While winglet (70) is specifically described herein as a modification to fan blades (30 or 50), it will be appreciated that winglet (70) may be used to modify any other fan blades.

In one embodiment, winglet (70) is formed from homogenous continuum of molded plastic. However, it will be appreciated that winglet (70) may be made from a variety of materials, including but not limited to any suitable metal and/or plastic, and may comprise a plurality of pieces. In addition, it will be appreciated that winglet may be made by any suitable method of manufacture.

It will also be appreciated that trailing vortices that form at or near the tips of fan blades (30 or 50) may increase lift near the tips of fan blades (30 or 50). Winglets (70) may inhibit the radial airflow over top surface (32 or 52) and/or bottom surface (34 or 54) near the tips of fan blades (30 or 50). Such inhibition may force air to flow more normally from leading edge (36 or 56) to trailing edge (38 or 58), thereby enhancing efficiency of a fan having fan blades (30 or 50) with winglets (70), at least at certain rotational speeds.

In one example, winglets (70) are attached to ends of fan blades (30 or 50) on a fan having a 6 foot diameter. With the addition of winglets (70), the air flow rate of the fan is increased by 4.8% at 171 rpm.

In another example, winglets (70) are attached to ends of fan blades (30 or 50) on a fan having a 14 foot diameter. With the addition of winglets (70), the air flow rate of the fan is increased by 4.4% at 75 rpm.

The following two tables illustrate efficiencies that may be obtained by adding winglets (70) to a fan having a 14 foot diameter:

TABLE 1

Fan Without Winglets (70)

| Speed (rpm) | Max. Power (watt) | Avg. Power (watt) | Torque (in · lbs) | Flowrate (cfm) | Efficiency (cfm/watt) |
|---|---|---|---|---|---|
| 12.5 | 54 | 50 | 17.86 | 0 | 0 |
| 25 | 66 | 54 | 78.80 | 34,169 | 632.76 |
| 37.5 | 125 | 82 | 187.53 | 62,421 | 761.23 |
| 50 | 339 | 263 | 376.59 | 96,816 | 368.12 |
| 62.5 | 700 | 660 | 564.01 | 110,784 | 167.85 |
| 75 | 1170 | 1140 | 839.75 | 129,983 | 114.02 |

TABLE 2

Fan With Winglets (70)

| Speed (rpm) | Max. Power (watt) | Avg. Power (watt) | Torque (in · lbs) | Flowrate (cfm) | Efficiency (cfm/watt) |
|---|---|---|---|---|---|
| 12.5 | 50 | 42 | 18.56 | 26,815 | 638.45 |
| 25 | 58 | 43 | 18.39 | 46,547 | 1,082.49 |
| 37.5 | 68 | 49 | 186.00 | 61,661 | 1,258.39 |
| 50 | 241 | 198 | 354.61 | 87,552 | 442.18 |
| 62.5 | 591 | 528 | 582.78 | 120,859 | 228.90 |
| 75 | 980 | 950 | 847.41 | 136,560 | 143.75 |

Of course, other values may be realized through use of winglets (70). In addition, suitable variations of winglets, including but not limited to alternative winglet configurations, will be apparent to those of ordinary skill in the art.

In summary, numerous benefits have been described which result from employing the concepts of the invention. The foregoing description of one or more embodiments of the invention has been presented for purposes of illustration and description. It is not intended to be exhaustive or to limit the invention to the precise form disclosed. Obvious modifications or variations are possible in light of the above teachings. The one or more embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus, comprising:
   (a) a fan blade, wherein the fan blade has a first end and a second end, wherein the fan blade further has an upper surface and a lower surface defining a maximum thickness at the first end, wherein the maximum thickness has a location relative to the lower surface, wherein the location of the maximum thickness defines a point on the lower surface, wherein at least part of the fan blade defines an airfoil shape; and
   (b) a winglet coupled with the first end of the fan blade, wherein the winglet comprises a substantially vertical member, wherein the substantially vertical member has a perimeter defined by a lower edge, an upper edge, and a rear edge, wherein the rear edge of the vertical member has a length that is greater than the maximum thickness of the first end of the fan blade, wherein the lower edge extends below the lower surface of the fan blade, wherein the lower edge and the upper edge meet at an intersection, wherein the intersection is located forward of a leading edge of the fan blade, and wherein the intersection is located below the point on the lower surface defined by the maximum thickness.

2. The apparatus of claim 1, wherein the vertical member comprises a rounded outer surface.

3. The apparatus of claim 2, wherein the vertical member further comprises a substantially flat inner surface.

4. The apparatus of claim 1, wherein fan blade further has a trailing edge, wherein at least part of the rear edge of the vertical member protrudes rearwardly relative to a vertical plane tangential to the trailing edge of the fan blade at the first end.

5. The apparatus of claim 1, wherein part of the upper edge of the vertical member protrudes forwardly relative to a vertical plane tangential to the leading edge of the fan blade at the first end.

6. The apparatus of claim 1, wherein part of the lower edge of the vertical member protrudes forwardly relative to a vertical plane tangential to the leading edge of the fan blade at the first end.

7. The apparatus of claim 1, wherein the upper edge of the vertical member is positioned above the upper surface of the fan blade at the first end.

8. The apparatus of claim 1, wherein each of the edges of the vertical member meets generally at a respective corner.

9. The apparatus of claim 8, wherein each of the corners of the vertical member edges is generally rounded.

10. The apparatus of claim 1, wherein the winglet further comprises a mounting member extending from the vertical member, wherein the mounting member couples the winglet with the first end of the fan blade.

11. The apparatus of claim 10, wherein the first end of the fan blade is substantially hollow, wherein at least a portion of the mounting member is configured to fit inside the substantially hollow first end of the fan blade.

12. The apparatus of claim 10, wherein the mounting member extends substantially perpendicularly from the vertical member.

13. The apparatus of claim 1, wherein the fan blade and the winglet are separate pieces that are joined together.

14. The apparatus of claim 1, wherein the fan blade defines a chord at the first end, wherein the vertical member has a length that is greater than the chord of the fan blade at the first end.

15. The apparatus of claim 1, wherein the upper surface of the fan blade has a generally elliptical curvature, wherein the lower surface of the fan blade has a generally elliptical curvature, wherein the generally elliptical curvature of the upper surface is based on a first ellipse, wherein the generally elliptical curvature of the lower surface is based on a second ellipse, wherein the second ellipse is based on the first ellipse.

16. The apparatus of claim 1, wherein the fan blade is formed as a hollow aluminum extrusion.

17. An apparatus, comprising:
  (a) a fan blade, wherein the fan blade has a first end and a second end, wherein at least part of the fan blade defines an airfoil shape; and
  (b) a winglet coupled with the first end of the fan blade, wherein the winglet comprises a substantially vertical member, wherein the substantially vertical member has a perimeter defined by a lower edge, an upper edge, and a rear edge, wherein each of the edges meets generally at a respective corner, wherein each of the corners is generally rounded, wherein the lower edge extends below a lower surface of the fan blade, and wherein the corner formed by the lower edge and the upper edge is located forward of a leading edge of the fan blade.

18. An apparatus, comprising:
  (a) a fan blade, wherein the fan blade has a first end and a second end, wherein the fan blade defines a chord at the first end, wherein the chord has a length, wherein at least part of the fan blade defines an airfoil shape, wherein the fan blade further defines a longitudinal axis; and
  (b) a winglet coupled with the first end of the fan blade, wherein the winglet comprises a substantially vertical member, wherein the substantially vertical member has a horizontal length measured along a horizontal dimension that is substantially perpendicular to the longitudinal axis of the fan blade, wherein the horizontal length of the vertical member is greater than the length of the chord of the fan blade at the first end, wherein the vertical member comprises an upper edge and a lower edge, wherein the upper edge and the lower edge intersect at a point forward of a leading edge of the fan blade, and wherein a portion of the upper edge and a portion of the lower edge define an acute angle having a vertex at the point.

19. An apparatus, comprising:
  (a) a fan blade, wherein the fan blade has a first end, a second end, an upper surface, a lower surface, a leading edge, and a trailing edge, wherein at least part of the fan blade defines an airfoil shape, wherein the upper surface and the lower surface define a maximum thickness; and
  (b) a winglet coupled with the first end of the fan blade, wherein the winglet comprises a substantially vertical member, wherein the substantially vertical member has a perimeter defined by a lower edge, an upper edge, and a rear edge, wherein at least a first portion of the rear edge of the vertical member is positioned rearwardly relative to a vertical plane tangential to the trailing edge of the fan blade at the first end, wherein the first portion of the rear edge is at a rearward distance greater than the maximum thickness, wherein the lower edge and the upper edge meet at a corner that is positioned forwardly relative to a vertical plane tangential to the leading edge of the fan blade at the first end, wherein the corner is at a forward distance less than the maximum thickness.

20. The apparatus of claim 19, wherein the trailing edge of the fan blade intersects a horizontal plane, wherein the first portion of the rear edge of the vertical member also intersects the horizontal plane.

* * * * *